United States Patent [19]

Watanabe

[11] Patent Number: 4,610,485

[45] Date of Patent: Sep. 9, 1986

[54] ANTILOCK SYSTEM FOR AIR BRAKE SYSTEM

[75] Inventor: Namio Watanabe, Menuma, Japan

[73] Assignee: Akebono Brake Industry Company Ltd., Tokyo, Japan

[21] Appl. No.: 615,358

[22] Filed: May 30, 1984

[30] Foreign Application Priority Data

Jun. 3, 1983 [JP] Japan .................................. 58-99136

[51] Int. Cl.[4] .......................... B60T 8/44; F16D 55/22
[52] U.S. Cl. ................................... 303/114; 188/72.3; 303/119
[58] Field of Search ............... 303/115, 116, 119, 114; 188/181 R, 181 A, 72.3, 72.7, 72.8, 196 BA, 71.9; 60/547.1, 561, 581, 593

[56] References Cited

U.S. PATENT DOCUMENTS

| | | | |
|---|---|---|---|
| 3,754,794 | 8/1973 | Durand | 303/119 |
| 3,910,645 | 10/1975 | Takeuchi et al. | 303/114 |
| 4,012,080 | 3/1977 | Engle | 303/114 |
| 4,071,283 | 1/1978 | Van House | 303/114 |
| 4,215,902 | 8/1980 | Sato et al. | 303/119 |
| 4,244,186 | 1/1981 | Mehren | 60/547.1 X |
| 4,399,894 | 8/1983 | Tribe | 188/196 BA X |

FOREIGN PATENT DOCUMENTS 0015052  1/1982  Japan .................................. 303/114

Primary Examiner—Duane A. Reger
Assistant Examiner—Robert J. Oberleitner
Attorney, Agent, or Firm—Wood, Dalton, Phillips Mason & Rowe

[57] ABSTRACT

Herein disclosed is an antilock system for use with an air brake system. The antilock system comprises a hydraulic cylinder mechanism which has a piston fitted therein and connected to the actuator rod of the air brake system. Further comprised is an oil pressure system for feeding an oil pressure to the hydraulic cylinder mechanism in response to a control signal detective of the locked state of a wheel or wheels, if any, to turn the brake arm, thereby to release the braking force.

5 Claims, 2 Drawing Figures

ANTILOCK SYSTEM FOR AIR BRAKE SYSTEM

BACKGROUND OF THE INVENTION

1. Field of the Invention

The present invention relates to air brake systems such as mounted on a vehicle and, more particularly, to an antilock system for use with such air brake systems.

2. Description of the Prior Art

One known form of air brake system (as disclosed in U.S. Pat. No. 4,399,894) is equipped with a disc brake-type brake system actuator having a power screw, with the braking force being applied by forward rotation of the power screw and released by backward rotation thereof. The air brake system is further equipped with a penumatic actuator for rotating the power screw forwardly and backwardly. More specifically, such pneumatic actuators are conventionally partitioned into two pressure chambers by means of a power piston and a diaphragm so that the power piston is reciprocated by varying the air pressure differential between the two chambers. An actuator rod joined to that power piston is connected to the brake arm of the power screw so that the power screw may be rotated forwardly or backwardly by the reciprocal movement of the actuator rod.

Another air brake system of the general type is disclosed in U.S. Pat. No. 3,997,035 to include a drum brake which generates a braking force by rotating a cam shaft.

Vehicles equipped with such air brake systems, however, may have one or more of their wheels locked while being braked, as where the road has a low coefficient of friction. In such case, it is desired to release the braking force so that the wheel or wheels may be unlocked, as is accomplished in the conventional hydraulic control-type brake systems. In order to prevent undesirably long braking distances, however, it is desirable to restore the braking force after the wheel or wheels are unlocked.

A braking system using such an "antilock" concept is disclosed in U.S. Pat. No. 3,929,383. The brake system thereof is controlled by varying the pressure difference between the two air chambers of a pneumatic actuator, as described above. However, to function properly, this braking system requires that the release of the braking force for effecting the antilock must be conducted very promptly, and because of the required pressure differential between the two air chambers, it has been found to be very difficult to ensure reliable, rapid response operation.

SUMMARY OF THE INVENTION

It is, therefore, an object of the present invention to provide a highly responsive, reliable antilock system suitable for use with an air brake system.

According to a feature of the present invention, there is provided an antilock system for an air brake system including a brake mechanism for applying and releasing a braking force in response, respectively, to forward and backward movement of a brake arm, an actuator rod connected to said brake arm, a pneumatic actuator for reciprocating said actuator rod, a hydraulic cylinder mechanism having a piston fitted therein and connected to said actuator rod, and pressure-applying means for applying hydraulic pressure to said hydraulic cylinder mechanism in response to a control signal corresponding to a locked state of a wheel to move said brake arm backward.

BRIEF DESCRIPTION OF THE DRAWINGS

Other objects, features and advantages of the present invention will become more apparent from the following description taken in conjunction with the accompanying drawing, wherein.

DESCRIPTION OF THE PREFERRED EMBODIMENTS

Figure 1:
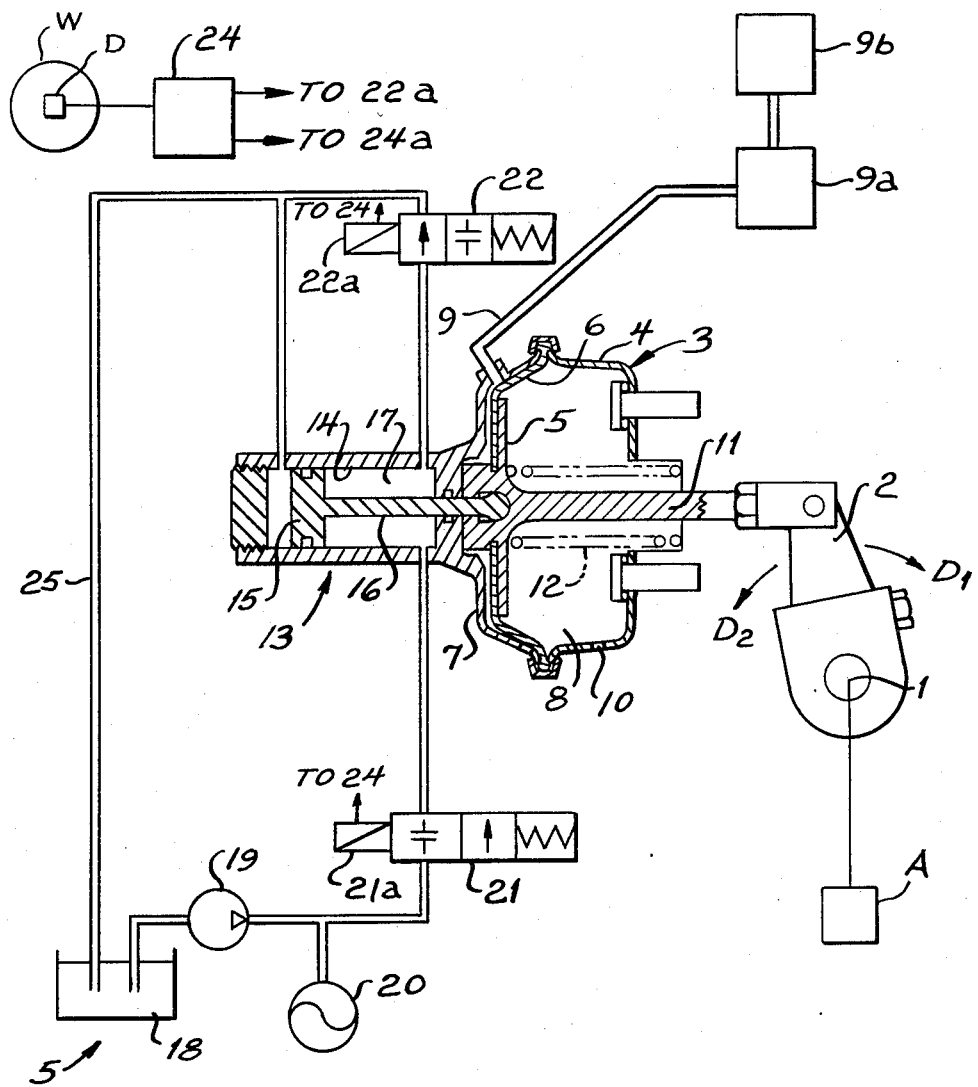
FIG. 1 is a schematic diagram showing the overall construction of the antilock system according to a first embodiment of the present invention.

With reference to FIG. 1 of the drawing, an input member comprising a power screw, or cam shaft, 1 of a conventional air brake system actuator A is arranged to rotate forwardly, i.e. in the direction of arrow $D_1$ to effect a braking operation as by generating a braking force, and to rotate rearwardly, i.e. in the direction of arrow $D_2$ to release the braking operation. It is generally preferable that the forward and rearward rotation of the power screw be conducted within substantially equal stroke ranges. As is customary, an adjusting device (not shown) may be provided in either the air brake system actuator or in an associated brake arm 2 for adjusting the rotational movement of shaft 1.

A pneumatic actuator 3 includes a housing 4, the inside of which is partitioned into a higher pressure chamber 7 and a lower pressure chamber 8 by means of a power piston 5 and a diaphragm 6 extending between the piston and housing 4. Lower pressure chamber 8 is continuously vented to atmosphere via a vent hole 10. The higher pressure chamber 7 is connected by way of a piping 9 with an air control valve 9a connected to a tank 9b containing compressed air at a desired pressure.

Power piston 5 has a stem defining an actuator rod 11 which extends to exteriorly of the pneumatic actuator 3. Rod 11, as shown, is the distal end of arm 2 for turning the arm forwardly and rearwardly in the directions of the arrows $D_1$ and $D_2$ as a result of longitudinal reciprocable positioning of the rod. Power piston 5 is normally held stationary in the illustrated position of FIG. 1 by the action of a return spring 12. In the illustrated arrangement of the actuator, no braking force is being applied.

The construction thus far described is similar to that of conventional air brake systems. The present invention comprehends that a hydraulic cylinder mechanism 13 be provided, adjacent pneumatic actuator 3, and having a piston 15 movable in a cylinder 14 to be coactive with power piston 5 of pneumatic actuator 3 by means of a connecting rod 16 to return power piston 5 against the air pressure acting thereon during a braking operation as an incidient of oil pressure being fed to an oil chamber 17 of the mechanism 13.

Oil chamber 17 is connected with an oil pressure supply S, including an oil reservoir 18, an oil pump 19, an accumulator 20, a normally closed, eletromagnetic first valve 21, and selectively operable, pressure releasing means comprising a return line 25 having a normally open, electromagnetic second valve 22. Thus, supply S defines means for selectively providing hydraulic pressure for controlling the positioning of piston 15.

First and second electromagnetic valves 21 and 22 are selectively controlled as shown in the following Table:

|  | Normal Configuration | Braking Force Released | Braking Force Held | Braking Force Reapplied |
| --- | --- | --- | --- | --- |
| Valve 21 | Closed | Open | Closed | Closed |
| Valve 22 | Open | Closed | Closed | Open |

Control signals for electromagnetically opening or closing valves 21 and 22 are generated by an antilock control circuit 24 comprising a conventional detector D which is mounted on a vehicle (not shown) for detecting the speed state of the vehicle wheels W. The solenoids 21a and 22a of valves 21 and 22 are controlled by the control 24. Such sensing controls are well-known to those skilled in the art and require no further description herein.

The braking force is "released" when wheel lock is caused as a result of an abrupt drop of the wheel speed. The braking force is "held" when the wheel lock is released as a result of reduction of the braking force so that a suitable coefficient of slip with the road is obtained, i.e., that the speed of the previously locked wheel or wheels is increasing. The braking force is "reapplied" when the wheel speed is sufficiently restored so that the braking force can be augmented in view of the suitable slip coefficient. As is well known to those skilled in the art, control for providing such signals are commercially available in a variety of electric control circuits.

The antilock system of the present invention operates as follows. When a braking operation is to be by operator effected, compressed air is introduced into higher pressure chamber 7 of pneumatic actuator 3 to move the power piston 5 rightwardly (as seen in FIG. 1) so that power screw shaft 1 is rotated forwardly by arm 2 to establish the desired braking force.

If, at this time, wheel lock is caused, oil pressure is fed to the chamber 17 of the hydraulic cylinder mechanism 13 by the opening of first electromagnetic valve 21 and closing of the second electromagnetic valve 22. As a result, an oil pressure force is directed leftwardly against piston 15 and, in turn, transmitted as a counteracting force to the power piston 3 connected to piston 15 by rod 16. The oil pressure force is caused to be sufficiently higher than the air pressure force acting on piston 5, so that the power screw shaft 1 is reversely rotated substantially instantaneously so that the braking force is abruptly decreased. The extent of this drop depends upon the pressure and quantity of the oil fed to chamber 17 and may be suitably selected as desired. If the wheel lock is released as a result of the drop in the braking force, first electromagnetic valve 21 closes to hold the oil pressure in oil chamber 17. If it is necessary to restore the braking force, the second electromagnetic valve 22 is opened. As will be obvious to those skilled in the art, these controls may be actuated in accordance with the speed conditions of the wheels in the known manner.

In view of the fact that the selective control of the feed and release of the oil pressure is extremely rapid, control of the braking operation may be conducted seriatim in a predetermined stepwise manner.

Figure 2:
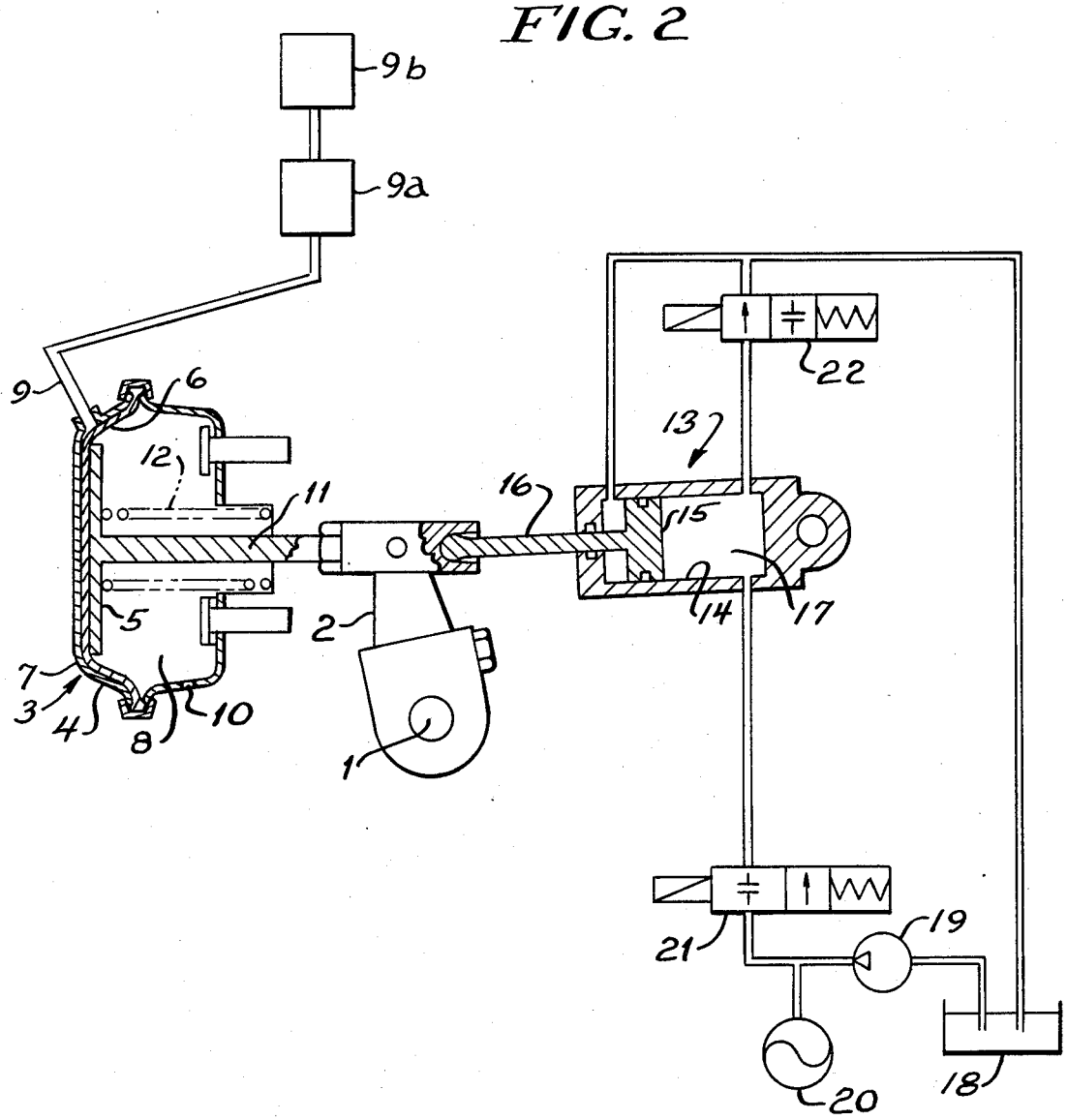
FIG. 2 is similar to FIG. 1 but shows a second embodiment of the present invention.

A second embodiment of the invention is shown in FIG. 2. In this antilock system, the hydraulic cylinder mechanism 13 is not arranged adjacent to the pneumatic actuator but is opposed to the actuator rod 11 at the opposite side of arm 2. The construction otherwise is similar to that of the first described embodiment, and the operation thereof is similar. As to the second embodiment, therefore, the same elements of the construction are indicated with the same reference numerals, and their explanations are omitted.

As discussed above, the antilock system of the present invention provides improved responsiveness. The system operates as an ordinary brake system when the hydraulic system is not operated. Thus, the antilock system does not require special failsafe mechanisms but can be incorporated directly into existing brake systems.

Thus, the antilock system of the present invention is simple and economical of construction, while yet providing improved braking operation of vehicle brake systems and the like effectively eliminating the dangerous brake locking which may occur with conventional brake systems.

I claim:

1. In an antilock air brake system including a brake mechanism for applying and releasing a braking force comprising a brake arm, a brake system actuator having an input member, means for selectively pressurizing pneumatic fluid, said brake arm being connected to the input member of the air brake system actuator, an actuator rod connected to said brake arm, and a pneumatic actuator defining a high pressure portion and a low pressure portion for reciprocatively moving said actuator rod, the improvement comprising:

a hydraulic cylinder mechanism disposed adjacent to said pneumatic actuator, said hydraulic cylinder mechanism having a reciprocably movable piston connected to one of (a) said actuator rod and (b) said brake arm; and hydraulic pressure means for providing hydraulic pressure to said hydraulic cylinder mechanism in response to a control signal resulting from a locked state of a wheel to move said brake piston against the air pressure of said pneumatic actuator so as to move said brake arm against the action of said high pressure portion of the pneumatic actuator.

2. The antilock system according to claim 1 wherein said hydraulic pressure means includes an oil pressure source, and a normally closed valve connected between a pressure chamber of said hydraulic cylinder mechanism and said oil pressure source, said valve being arranged to be opened in response to said control signal.

3. The antilock system according to claim 2 wherein said hydraulic pressure means further includes a reservoir, and pressure releasing means including a normally open valve connected between said pressure chamber and said reservoir and arranged to be closed in response to said control signal.

4. The antilock system according to claim 1 wherein said hydraulic cylinder mechanism and said pneumatic actuator are juxtaposed at one side of said brake arm.

5. The antilock system according to claim 1 wherein said hydraulic cylinder mechanism and said pneumatic actuator are opposed to each other at opposite sides of said brake arm.

* * * * *